Jan. 12, 1965  SHAO-TANG LEE  3,165,280
AMPHIBIOUS CONVERTIJET AIRCRAFT
Filed Aug. 27, 1962  8 Sheets-Sheet 7
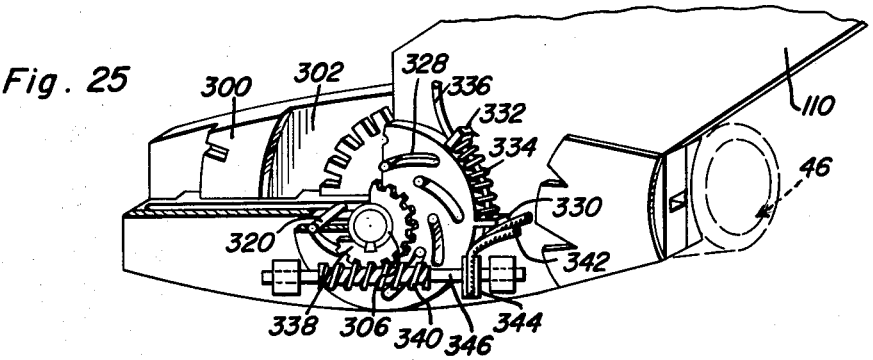
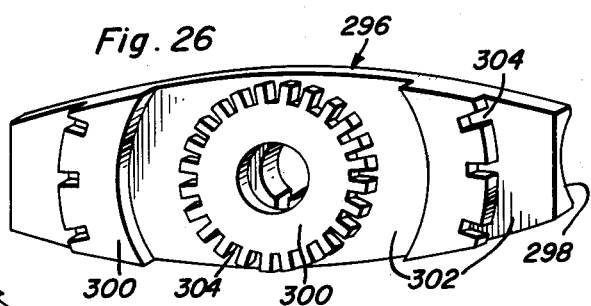
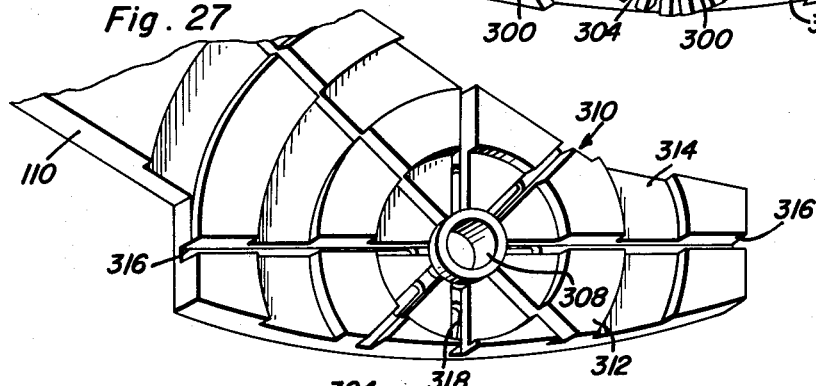
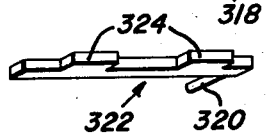
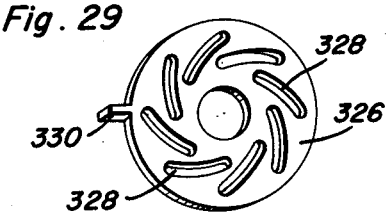
Shao-Tang Lee
INVENTOR.

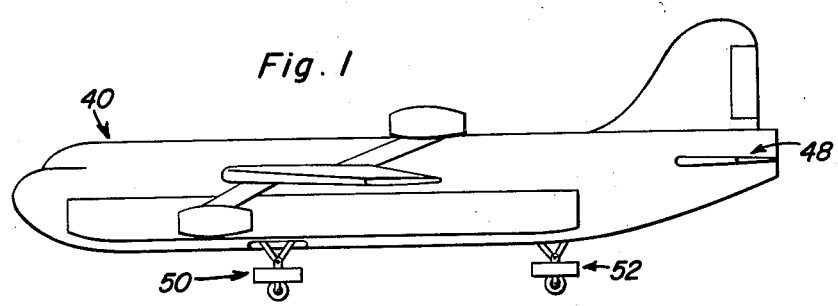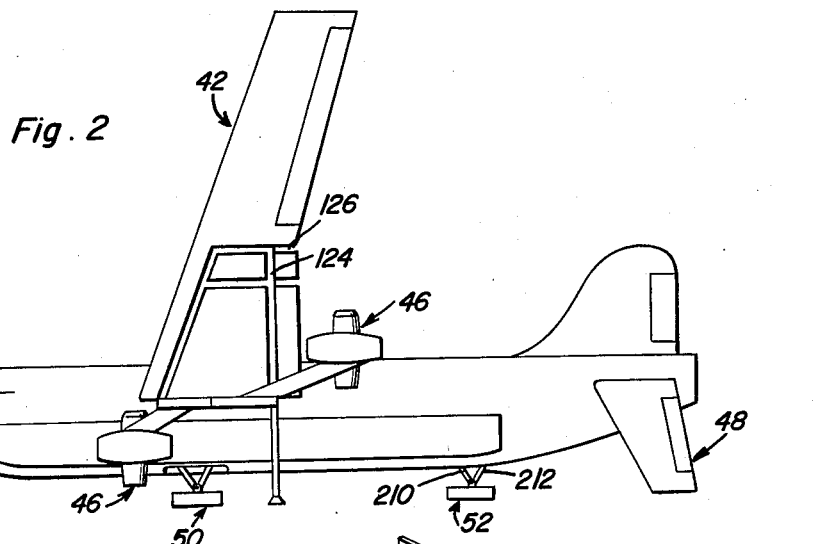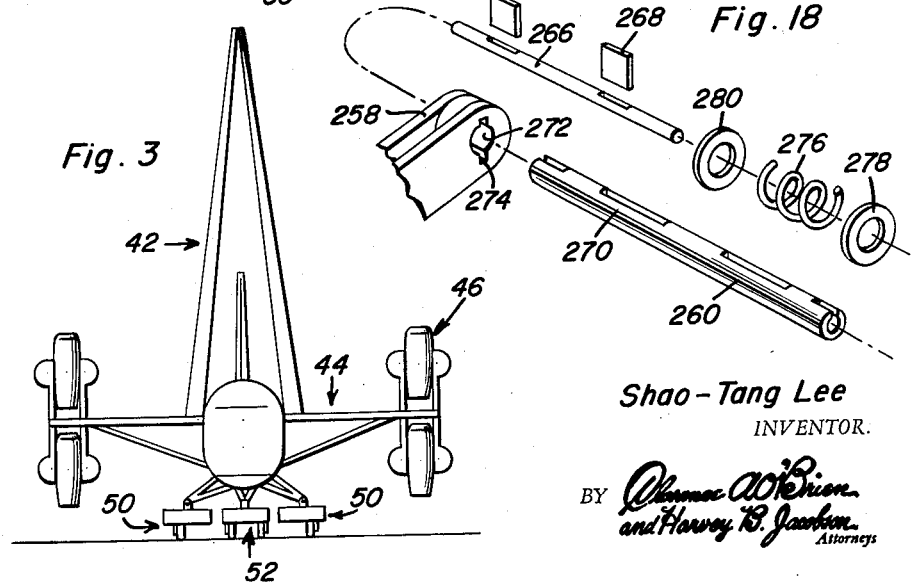

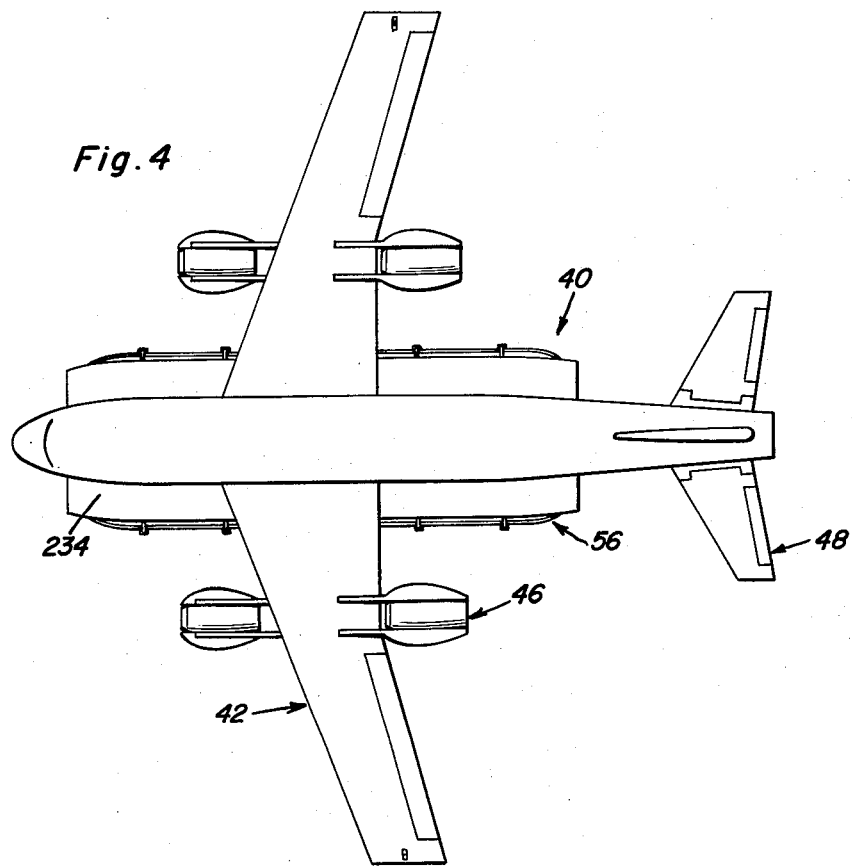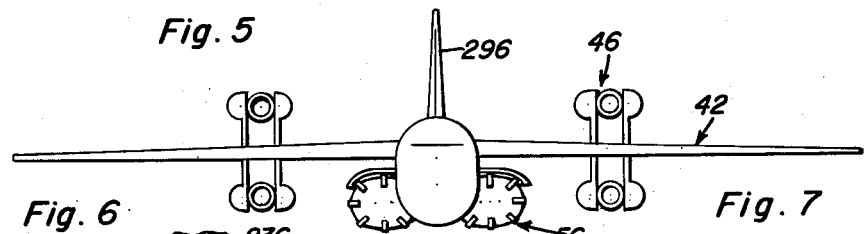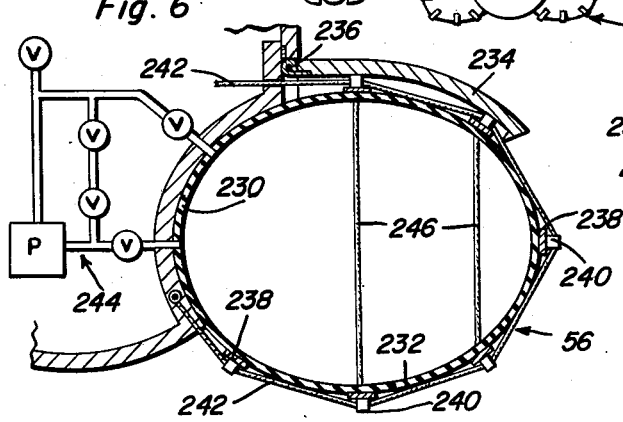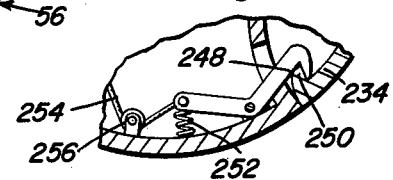

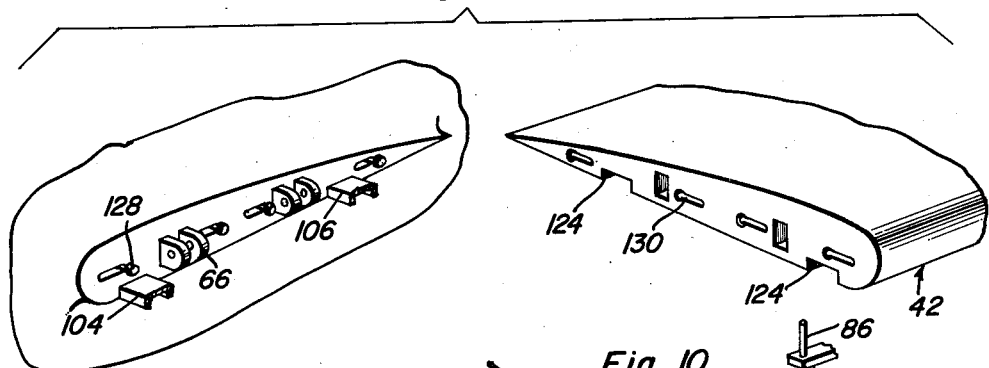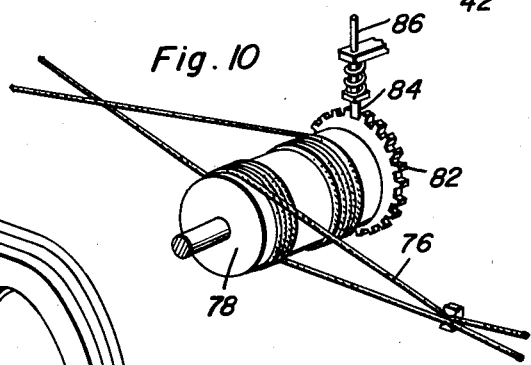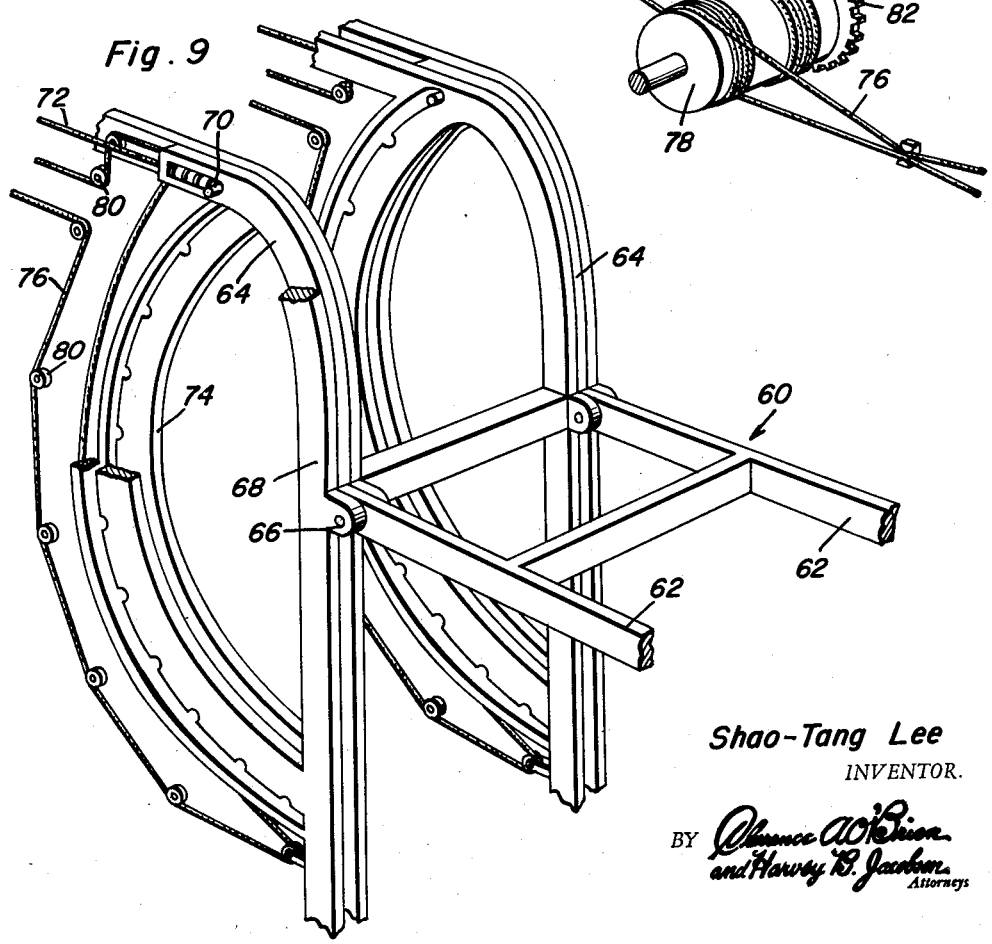

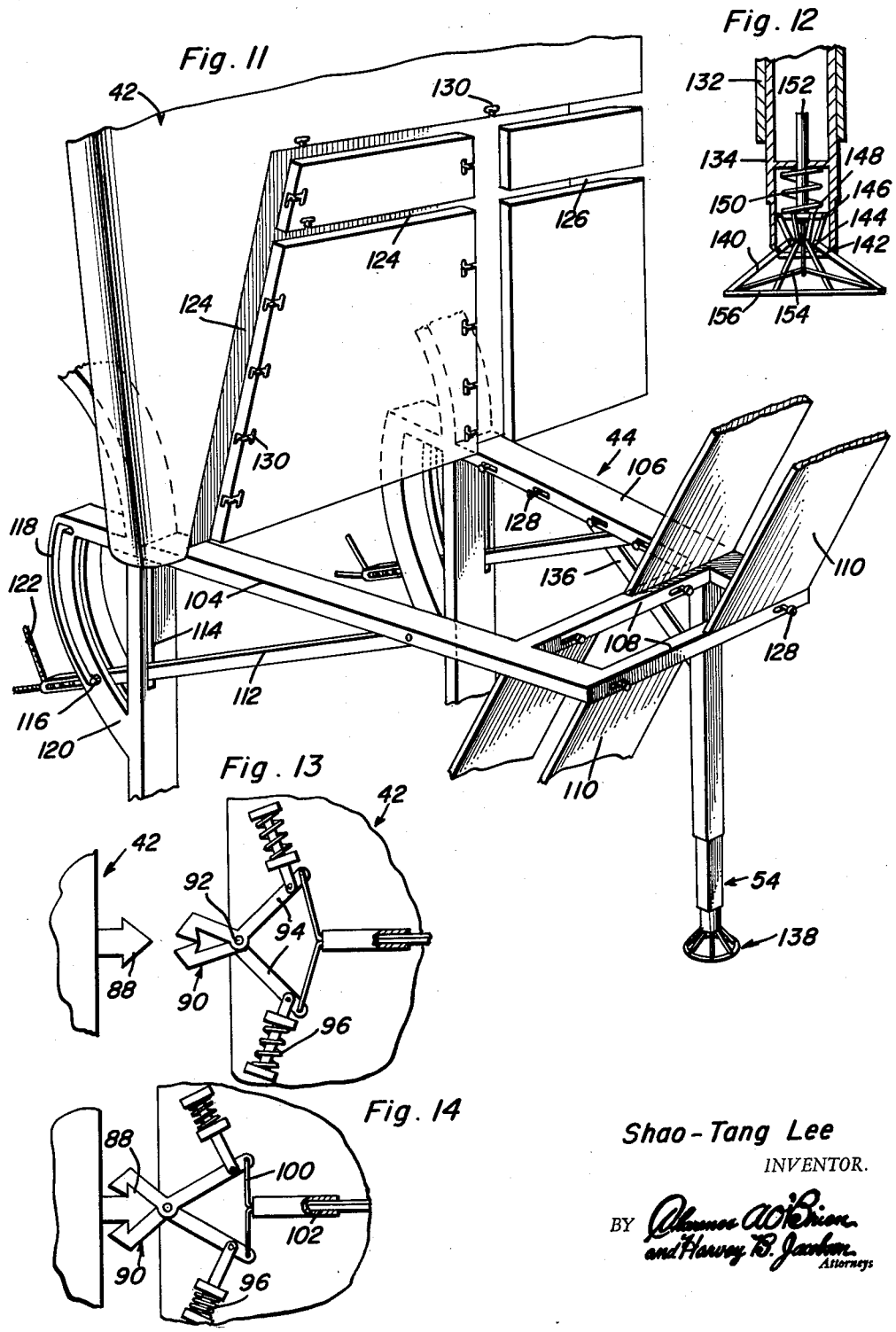

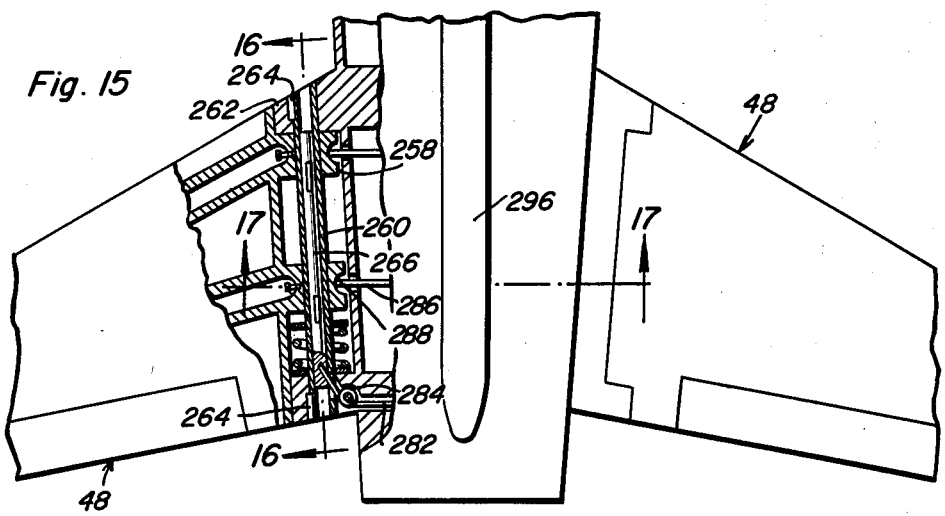
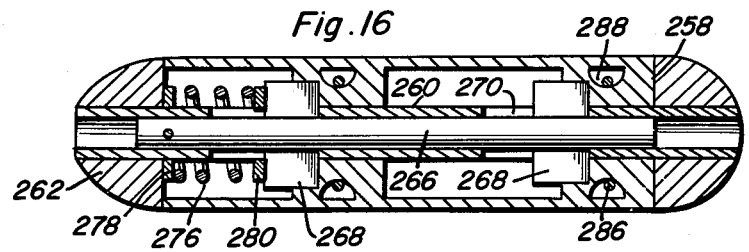
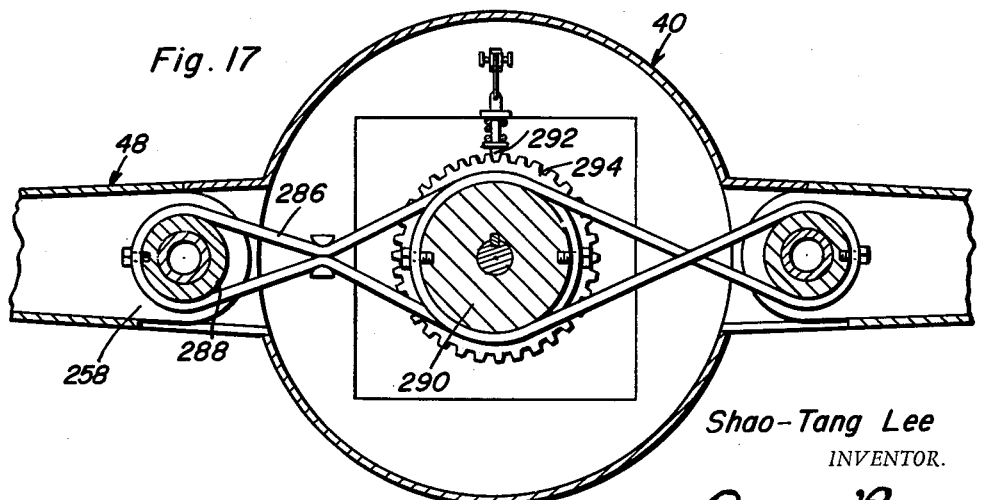

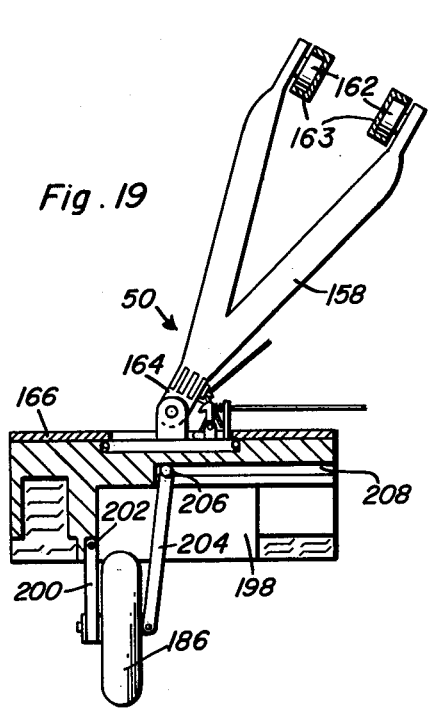
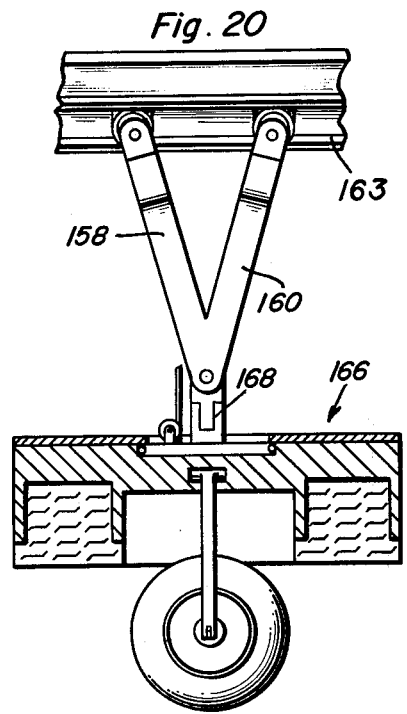
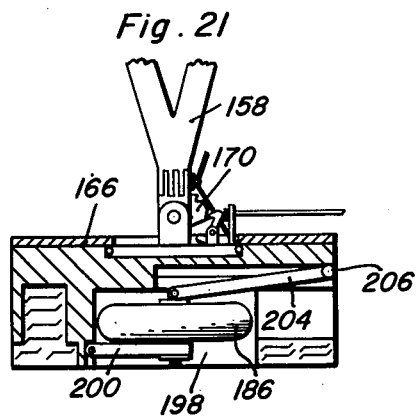
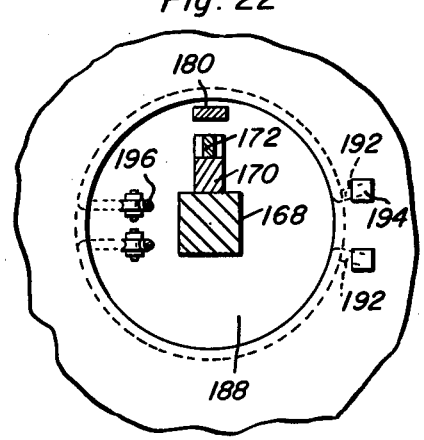
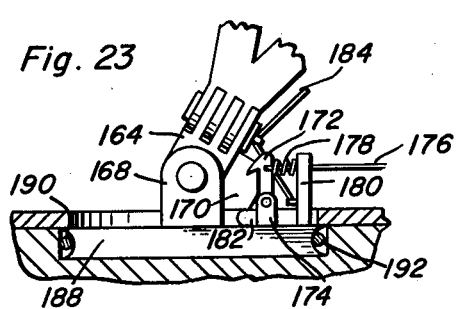

Jan. 12, 1965  SHAO-TANG LEE  3,165,280
AMPHIBIOUS CONVERTIJET AIRCRAFT
Filed Aug. 27, 1962  8 Sheets-Sheet 8
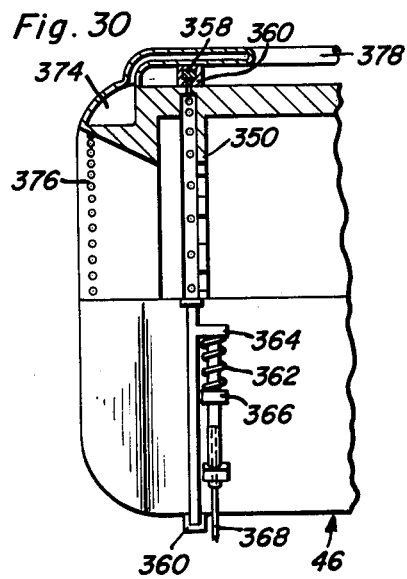
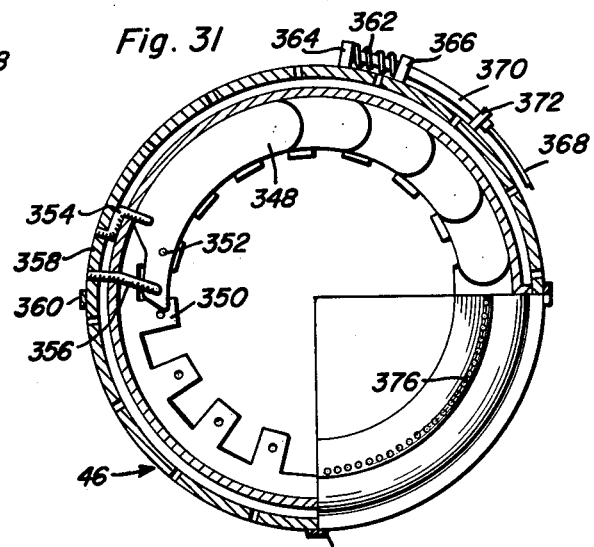
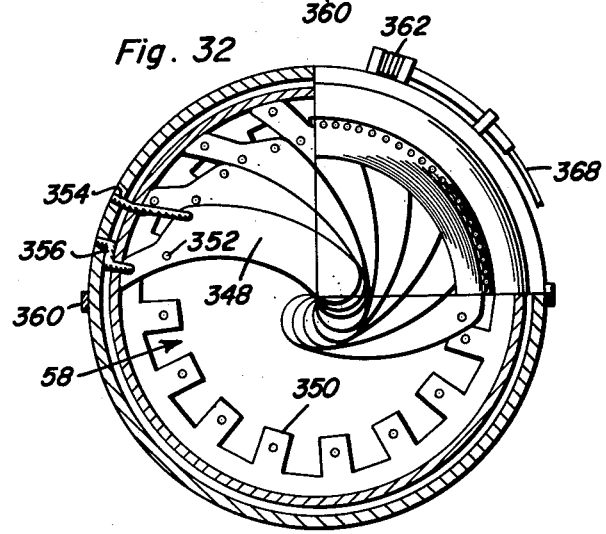
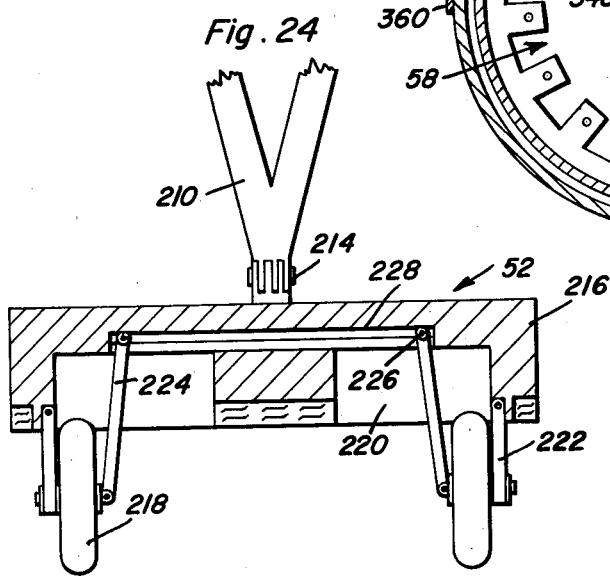
Shao-Tang Lee
INVENTOR.

United States Patent Office 3,165,280
Patented Jan. 12, 1965

3,165,280
AMPHIBIOUS CONVERTIJET AIRCRAFT
Shao-tang Lee, 25 Chi-Kuang St., Taichung,
Taiwan Province, China
Filed Aug. 27, 1962, Ser. No. 219,652
16 Claims. (Cl. 244—12)

Since earliest times, man has admired and envied the ability of birds to fly gracefully through the air. The desire of man to imitate the flight of birds has, in recent years, resulted in advances, in the field of aeronautics, far beyond the expectations and dreams of the pioneers. However, in spite of the significant advances which have taken place, substantial room for improvement exists in regard to the taking off and landing of airplanes. In regard to this phase, man has again attempted to simulate the birds, airplanes now utilizing two of the three conventional methods of taking off and landing associated with various types of birds. The first of the two methods used in taking off involves the rapid moving of the airplane along the ground, generally a runway, until sufficient lift is developed so as to make the plane airborne. The landing generally reverses the take off with the speed of the plane being diminished with the assistance of a brake. This manner of taking off and landing simulates birds such as pheasants which run rapidly along the ground with the wings expanded until the desired lift is achieved, and which, when landing, guide along slightly above the ground with the feet or claws acting in the manner of a gradual brake.

The second manner of taking off utilized in airplanes, and by some flying animals, involves initially being dropped or falling from a great height so as to allow an initial gliding movement prior to the powered movement through the air.

However, no successful attempt has been made, in regard to airplanes, in imitating the third, and most efficient, manner of taking off and landing normally associated with birds such as for example pigeons. This third manner involves the gathering of the wings close to the body and the leaping of the bird vertically into the air, after which the wings are spread and fluttered. The descent is equally as efficient and rapid, and involves the elevating of the wings into a general V-shape so as to reduce the tendency to glide and cause a quick descent. Just prior to landing, the wings are fluttered forwardly so as to produce a braking effect and allow for a smooth landing.

It is to imitate this third manner of taking off and landing that the instant invention has been conceived. Accordingly, it is a primary object of the instant invention to produce a substantially horizontal wing aircraft which can, in effect, leap vertically into the air, upon taking off, stretch its wings horizontally so as to behave in the manner of a conventional plane in flight, and fold its wings and descend vertically in landing.

In conjunction with this basic object, it is an object of the instant invention to incorporate various features into the aircraft which, in addition to enabling a manipulation of the wings, tail stabilizers, and jet engines, also provides for the landing and taking off of the aircraft under all sorts of ground conditions.

More specifically, it is an object of the instant invention to provide unique landing gear for the aircraft which consists of retractible enlarged platforms or feet for landing on soft or wet soil, with these landing palms incorporating retractible wheels usable in the manner of conventional wheels for landing on hard surfaces as well as for the taxiing of the aircraft.

Likewise, it is an object of the instant invention to incorporate a pair of auxiliary retractible and extensible landing bases.

Furthermore, it is an object of the instant invention to provide collapsible pontoons or frog sacks for landing on water.

In addition, it is an object of the instant invention to provide unique shutter means in association with the jet engines so as to exclude foreign matter during the initial taking off of the aircraft, especially under wet or dusty situations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of the airplane of the instant invention with the wings and jets horizontally orientated and with the landing palms and landing wheels extended;

FIGURE 2 is a side elevational view of the airplane with the wings, tail stabilizers, and jets vertically orientated and with the main and auxiliary landing palms extended and the wheels retracted;

FIGURE 3 is a front view of the airplane, as shown in FIGURE 2, with the wheels extended;

FIGURE 4 is a top plan view of the airplane with the pontoons or frog sacks inflated;

FIGURE 5 is a front view of the airplane as shown in FIGURE 4;

FIGURE 6 is an enlarged cross-sectional view illustrating details of the frog sack and, schematically, the controls therefor;

FIGURE 7 is an enlarged partial cross-sectional view illustrating the details of the locking mechanism for the frog sack covers;

FIGURE 8 is an exploded perspective view of the inner end of one of the wings and the adjoining plane fuselage;

FIGURE 9 is a partial perspective view of the wing frame and control means therefor;

FIGURE 10 is a perspective view illustrating the winding drum which, through cables, effects the simultaneous raising and lowering of the wings;

FIGURE 11 is a perspective view illustrating a jet engine frame and its association with a wing;

FIGURE 12 is a cross-sectional detail of the lower end of one of the auxiliary landing palms;

FIGURE 13 and FIGURE 14 illustrate details of the locking mechanism on the wing tips;

FIGURE 15 is a partial top plan view of the tail of the airplane with portions broken away so as to illustrate the mounting and control of the movable tail stabilizers;

FIGURE 16 is an enlarged cross-sectional view taken substantially on a plane passing along line 16—16 in FIGURE 15;

FIGURE 17 is an enlarged cross-sectional view taken substantially on a plane passing along line 17—17 in FIGURE 15, and shows the winding drum which controls the simultaneous movement of the tail stabilizers;

FIGURE 18 is an exploded perspective view of the various control elements for the tail stabilizer as shown in FIGURES 15 and 16;

FIGURE 19 is a cross-sectional view illustrating details of one of the front landing palms with the wheel extended;

FIGURE 20 is a transverse cross-sectional view illustrating further details of a front landing palm;

FIGURE 21 is a cross sectional view illustrating a front landing palm with the wheel retracted and the palm orientated for reception into the bottom of the plane;

FIGURE 22 illustrates the details of the directional control for a front landing palm;

FIGURE 23 is an enlarged sectional detail of the universal joint between the leg and the palm itself;

FIGURE 24 is a partial sectional view illustrating details of the rear landing palm;

FIGURE 25 is a view, with portions broken away for purposes of illustration, of the rotational control means for a jet engine;

FIGURES 26, 27, 28 and 29 are perspective views of the various components which go into making up the jet control of FIGURE 25;

FIGURE 30 is a partial sectional view illustrating details of the leading end or head of a jet;

FIGURE 31 is a transverse view of the jet head with the shutter therein in its open position; and FIGURE 32 is a view similar to FIGURE 31 illustrating the shutter in its closed position.

Referring now more specifically to the drawings, reference numeral 40 is used to generally designate the airplane of the instant invention. The plane 40 includes a pair of wings 42 which are selectively positionable anywhere between a first horizontal position, as shown in FIGURE 1, and a second vertical position, as shown in FIGURE 2. Fixed to the fuselage of the plane 40 immediately below the wings 42 are a pair of rigid laterally projecting support frames 44, each of these frames 44 rotatably mounting a low front jet and a high rear jet, these jets or jet engines being generally designated by reference numeral 46. The jet engines 46 are rotatably mounted for movement between the horizontal position through a 90 degree vertical position to an angle of approximately 135 degrees. Further, the plane 40 includes tail stabilizers 48 adjustable between a first horizontal position as shown in FIGURE 1 and a second vertical position as shown in FIGURE 2. Likewise, front and rear landing palms or pads 50 and 52 are provided, along with auxiliary landing palms or legs 54 which are retractible into the jet engine support frames 44. In addition, the plane includes inflatable floats, pontoons or frog sacks 56. Finally, the jet engines 46 themselves incorporate novel means, in the form of both a fluid barrier and a selectively closable shutter construction 58, for temporary sealing of the intake end of each jet engine.

In regard to the construction of the wings 42, and the manner in which the pivotal adjustment thereof is effected, attention is specifically directed to FIGURES 8–11. Each wing 42 includes a framework 60 formed in part by longitudinally extending structural members 62 which include, integral with the inner ends thereof, upwardly arced arms 64. The inner end of each of the structural members 62 is pivotally mounted between a pair of ears 66 fixed to and projecting outwardly from a pair of adjacent fuselage ribs 68. The bent arm portion 64 is received between the pair of ribs 68 and guided thereby, the upper or inner end of the bent arm 64 having a transverse spring loaded pawl 70 controlled by a cable 72. Each of the ribs 68 includes a rigid notched arcuate segment 74 fixed thereto and concentric with the point of pivotal mounting of the structural member 62 whereby the pawl 70 can be, upon a pivoting of the wing, selectively engageable in any of the notches for varying the position of the corresponding wing 42. Movement of the wings 42 is effected through elongated control cables 76, each having the central portion thereof wound on a winding drum 78 located within the plane 40, and the opposite ends thereof engaged, through a series of pulleys 80, with the extreme upper or inner end of the arcuate arm 64 so as to pivot this end, and consequently the entire wing 42, about the pivotal mounting point. The winding drum 78 includes a cog wheel 82 fixed thereto and selectively engaged by a spring biased pawl 84 which is in turn controlled through the cable 86. As such, in order to vertically adjust the wing 42, both the pawl 70 and the pawl 84 have to be disengaged, after which the winding drum 78 is rotated in the desired direction so as to effect, through the cable 76, the raising or lowering of the wing 42. Incidentally, it will be noted that the pawl 70 projects beyond both sides of the arm 64 so as to engage in opposed notches in both of the arcuate members 74.

In order to additionally stabilize the wings 42 in the extreme vertical position, it is contemplated that a releasable lock mechanism be provided between the wing tips. This lock mechanism is illustrated in FIGURES 13 and 14, and consists of an arrow-headed projection 88 rigid with one wing tip and receivable within spring biased jaws 90 on the other wing tip. The jaws 90 are oppositely directed and pivotally mounted at a common point 92. Each of the jaws includes a diverging arm 94 integral therewith. Associated with the outer end of each of the jaw arms 94, is a compression spring unit 96 biasing the arm outwardly and consequently pivoting the jaw inwardly whereby, upon movement of the arrow-headed projection 88 into contact with the jaws 90, the jaws 90 will be pivoted outwardly away from each other allowing the arrowhead to pass, with the spring units 96 subsequently locking the jaws behind the arrowhead, the cooperative faces on the arrowhead and jaws preventing a retraction of the projection 88 until the jaws are physically moved outward away from each other. This releasing movement of the jaws 90 is achieved through a pair of control cables 100, each engaged with the outer or free end of one of the jaw arms 94 in a manner whereby a pull on the cables 100 will move the outer ends of the arms 94 toward each other against the biasing force of the spring units 96 so as to free the arrow-shaped head of the projection. As will be noted in FIGURES 13 and 14, these cables 100 extend through a flexible tube 102. Thus, it will be recognized that as the wings 42 are moved into the extreme vertical position, the tips thereof will be automatically locked to each other, and will stay locked to each other until positively unlocked such as would be required prior to a movement of the wings to their horizontal position.

Fixed to the fuselage of the plane 40 and projecting outwardly therefrom directly beneath the wings 42 are the jet engine support frames 44. Each of the support frames 44 includes front and rear slightly converging hollow beams 104 and 106, the front beam 104 serving as a conduit for the various necessary pipes, such as oil and air pipes, and the wiring necessary in the operation of the engine 46. The rear hollow beam 106 is formed so as to receive the collapsible retracted auxiliary landing leg or palm 54. The longitudinally extending beams 104 and 106 are interconnected at their outer ends by a pair of laterally extending beams 108, these beams 108 having the engine support arms 110 rigidly fixed thereto in a downwardly and forwardly inclined pair and an upwardly and rearwardly inclined pair so as to position the jet engines 46 in longitudinal alignment, as best seen in FIGURES 1–5, with the forward jet being below the horizontal wings and with the rear jet being above the horizontal wings. Pivotally connected to each of the beams 104 and 106 at approximately mid point along the length thereof, are retractible braces 112. Each of the braces 112 extends through a vertical guide slot 114 in a rib of the fuselage, and, includes, on its inner end, a spring biased pawl 116 which travels in an arcuate slot 118 in member 120, locking notches being provided at each end of the slot 118 for receiving the pawl 116 under the influence of its spring. The controlled extraction of the pawl 116 from either one or the other of the locking notches, as well as the movement of the cross brace 112 is controlled through the cable 122 which is to be operatively associated with the movement of the corresponding wing 42 whereby the cross brace 112 will be retracted into the beam 104 and 106 upon a movement of the wing to its horizontal position, and conversely, the brace 112 will be moved downwardly into its diagonal bracing position, upon a movement of the wing 42 to the vertical position.

With particular reference to FIGURE 8, it will be noted that the undersurface of the wings 42 are provided with recesses 124 therein, these recesses receiving the structural beams 104, 106 and 108 of the support frame 44 upon the assuming of the horizontal position by the wings 42, the support frame 44 thereby assisting in the stabilization and support of the wings 42. In addition to the recesses 124, it will be noted that a pair of slots 126 are provided adjacent the rear edge so as to allow for the vertical extension of the upper support arms 110 therethrough inasmuch as the support frame 44 is obviously narrower than the corresponding wing 42. In order to lock the wings 42 in their horizontal position, a plurality of sliding bolt type locks 128 are provided in conjunction with opposed angle slots 130 along the various structural members of the frame 44 and between the inner end of each wing 42 and the plane fuselage. Means for simultaneously engaging and releasing the slidable bolts or lugs 128 will of course be provided.

The auxiliary landing palm or leg 54, reference being had to FIGURES 11 and 12, consists of a pair of telescopically collapsible tubes 132 and 134 pivotally mounted to the rear structural beam 106 and both retracted and extended through an adjustable brace 136, somewhat in the manner of a conventional landing gear wherein the upper end of the brace 136 is slidable within the beam 106 and hingedly connected to the outer tube 132 so as to enable a drawing of the entire leg 54 into the beam 106. The actual pad or foot 138 consists of links or ribs 140 pivoted at 142, 144 and 146, the pivoted connection 142 being to the lower end of the lower tube 134, and the pivoted connection 146 being to a disk 148 located within the lower tube 134 and resiliently biased outward by compression spring 150, both the disk 148 and spring 150 being centrally located by an elongated rod 152 which is engaged, through cables 154, to the lower ends of the ribs 140 whereby a pull on the rod 152 will effect an inward drawing or collapsing of the ribs 140. Incidentally, a suitable flexible membrane 156 is also provided on the ribs 140.

Referring now to FIGURES 19–23, it will be noted that the two front or forward landing palms 50 have been detailed therein. These landing palms, noting the elevational view of FIGURE 3, diverge outwardly from each other so as to be orientated slightly laterally of the plane fuselage. Each of the landing palms 50 includes forward and rearward bifurcated legs 158 and 160, with the bifurcations of each of the legs diverging from each other and having roller means 162 rotatably mounted on the free or upper ends thereof and movable in fuselage guide channels 163. These legs 158 and 160 are hingedly mounted about a first axis to a mounting block 164 whereby a pivotal spreading of the legs 158 and 160 from each other is possible so as to effect a vertical raising of the pad or foot 166 itself. The block 164 is in turn pivotally secured to ears 168 projecting vertically from the foot or pad 166 for movement about an axis transverse to the rotational axis of the pivotal engagement of the legs 158 and 160 with the block 164. In this manner, the pads can move from a first position wherein they are oriented horizontally for proper engagement with the ground surface, and a second position wherein they are orientated at an angle to the horizontal and substantially perpendicular to the longitudinal extent of the legs 158 and 160 for convenient retraction into the fuselage. In order to lock the pad 166 in its horizontal landing position, a notched projection 170 is provided integral with the block 164. The notch in the projection 170 receives a spring biased hook 172 pivotally mounted between a pair of mounting ears 174 and controlled through a control cable 176 extending therefrom through the coil spring 178 and the upper end of an abutment post 180. In addition it will be noted that the spring biased hook member 172 includes an integral laterally directed extension 182 engaged with the bottom of the projection 170 in the locked position, this extension 182, upon exertion of a pull on the control cable 176 so as to release the hook 172, causing an upward pivoting of the projection 170 so as to insure a complete disengagement of the hook 172, thereby allowing a movement of the pad or foot 166 to a position perpendicular to the legs 158 and 160. In order to engage the hook 172 with the projection 170, it will be noted that a second control cable 184 has been provided which, upon being tensioned, will draw the pad 166 to the horizontal with the hook 172 riding on the external surface of the projection 170 until the notch is reached and engaged.

In order to control the horizontal direction of each of the pads 166, such as when the plane 40 is being taxied on the wheels 186, a flat disk 188 is rotatably mounted within the upper surface thereof, all of the above described joint structure between the legs 158 and 160 and the pad 166 being engaged with this disk 188 with the remainder of the pad or foot 166 being rotatable relative thereto. The disk 188 includes an annular groove 190 peripherally thereabout within which a pair of oppositely extending control cables 192 are positioned, these control cables 192 each having a first end thereof fixed, as at 194, to the pad 166, and having the opposite ends thereof protruding through the disk 188, as at 196, whereby a pull on these last mentioned ends will result in a rotation of the pad 166 about the disk in either direction depending upon which cord is pulled, the opposite cord or cable from the cable being pulled of course being payed out at the same rate so as not to interfere with this rotational movement.

Each of the front palms 50 includes one of the selectively retractible and extensible wheels 186 movable between a first vertical position depending below the pad 166, as illustrated in FIGURES 19 and 20, and a second horizontal position received within a recess 198 in the bottom of the pad 166, as illustrated in FIGURE 21. Movement of each of the wheels 186 is substantially in the manner of a conventional retractible landing wheel. For example, the wheel 186 is rotatably mounted on a shaft which projects laterally from the lower end of a support arm 200 which in turn has its opposite end pivotally fixed, as at 202, to the pad 166. It is through movement about this point 202 that the wheel 186 is moved from its vertical extended position to its horizontal retracted position, with the movement being effected by a combination control arm and brace 204 having one end pivotally engaged with the wheel axle and having an enlarged head 206 slidable or guidable in a laterally extending channel 208 in the pad 166 above the wheel recess 198.

The rear landing palm 52, reference being had to FIGURES 1, 2, 3 and 24, is located along the longitudinal center line of the airplane 40 and, as was the case with the front landing palms 50 includes diverging bifurcated front and rear legs 210 and 212. These legs 210 and 212 are hingedly mounted, as at 214, for pivotal movement about a single axis whereby a varying of the degree of divergence of the legs 210 and 212 from each other will effect a raising and lowering of the rear landing palm 52, this being accomplished, in the same manner as the front landing palms 50 through rollers secured to the upper ends of the legs 210 and 212 and guided within the elongated grooves or channels.

The rear landing palm 52, in addition to the enlarged foot or pad 216, includes a pair of extensible and retractible wheels 218 movable between a vertical depending position below the bottom of the pad 216, and a horizontal retracted position within a pair of recesses 220 in the bottom of the pad 216. In order to effect this movement, each of the wheels 218 is mounted upon an axle fixed to and extending laterally from an elongated support arm 222 which is in turn pivotally mounted, at its other end, to the bottom of the pad 216. The actual movement of the wheels 218, in each instance, is effected through a combination control arm and brace 224, this arm 224 having one end pivotally secured to the opposite end of the wheel axle, and includes an enlarged head 226 on the other end thereof slidable within an elongated slot or guide channel 228 within the pad 216 just above the recesses 220.

It is contemplated that the movement of the legs 158 and 160, and the legs 210 and 212 relative to each other be controlled hydraulically, with the hydraulic control system also functioning so as to provide shock absorbent qualities. The ability to progressively vary the degree of projection of the landing palms 50 and 52 is particularly significant in that after the airplane has landed, the plane can be slowly lowered to the ground so as to allow the passengers to disembark without the necessity of providing additional ladders or stairs. It will of course be appreciated that various covers or doors are provided so as to enclose the landing palms when they have been retracted into the fuselage.

Inasmuch as the airplane 40 is to both take off and land vertically, it is also contemplated that means for enabling this vertical take off and landing on water be provided. Thus, the elongated pontoons or frog sacks 56 are provided so as to act as floats. Each of these frog sacks 56 is received within a longitudinally extending recess 230 along one side of the belly of the plane 40. The frog sack 56 itself includes an elongated inflatable member 232 which, when collapsed, is completely receivable within the recess or fuselage groove 230, and closed therein by a hinge mounted lid or cover 234 which, through spring means 236, is biased continually toward the closed position. The inflatable member or sack 232 has a plurality of reinforcing ribs 238 fixed thereto and extending longitudinally thereof. These ribs 238 are provided with a series of circumferentially aligned cable guides 240 through which a controlled cable 242 extends, this cable having one end thereof fixed to the recess forming wall adjacent the bottom thereof, and the opposite end of the control cable 242 projecting into the fuselage adjacent the upper end of the recess forming wall and engaged with a suitable control mechanism for exerting a pull thereon in a manner so as to assist in collapsing the frog sack 56 neatly into the recess 230. Suitable valve controlled pump means, schematically illustrated at 244, is provided for effecting both the expansion and retraction of the frog sacks 56. Further, limit ropes 246 are provided within the inflatable member 232 itself so as to assist in retaining the inflatable member 232 in the desired oval shape shown in the drawings.

In order to lock the frog sack lid 234 in its closed position, a spring biased hook 248 is provided, this hook, upon a closing movement of the lid 234, guiding over a locking shoulder 250 on the leading edge of the cover 234 and engaging therebehind due to the biasing effort of the spring 252. Release of this locking latch 248 is achieved through a control cable 254 entrained over suitable guide pulleys 256.

Basically, inflation of the float means 56 is achieved by initially introducing pressure into the inflatable members 232, from the pump means 244, sufficient so as to result in an expansion of the inflatable members to a degree which will enable a support of the plane 40. Next, the lid 234 is released through the control cable 254 with the pressure previously introduced into the inflatable members 232 causing an immediate outward expansion of these members. The collapse of the float means 56 is achieved through a combined withdrawal of the air by the pump means 244 and a compacting of the inflatable members 232 through the control cables 242 which encircle the inflatable members 232. As the inflatable members 232 are retracted into the recesses 230, the covers 234 close toward latching engagement with the latch hooks 248. Incidentally, if so desired, means can be provided for locking each of the lids 234 in its open position with the closing of the lid 234, after a collapsing of the float means 56, being achieved through the weight of the lid 234 itself upon release of the latch means locking it in its open position. This closing movement of the lid 234 will also be augmented by the vertical movement of the plane 40 during take off.

As will be appreciated, the tail stabilizers 48 are also adjustable between a horizontal position, as shown in FIGURE 1, and a vertical position as shown in FIGURE 2. This adjustment of the tail stabilizers 48 will best be understood from FIGURES 15–18 wherein it will be noted that each stabilizer 48 includes a pair of inwardly projecting knuckle-like projections 258 which, through an elongated tubular shaft 260, mount the stabilizer on a pair of outwardly projecting knuckle-like projections 262 integral with the plane body. The tubular shaft 260 extends through the projections 258 and 262, and is fixedly keyed, as at 264 to the body projections 262, the stabilizer projections 258 being rotatable on the shaft 260. An elongated rod 266 is slidably received within the tubular shaft 260 and has rigidly fixed thereto a pair of lugs 268, each of the lugs 268 projecting from the rod 266 in diametrically opposite directions. The lugs 268 extend through elongated slots 270 in the shaft 260 whereby limited longitudinal movement of the rod 266 and lugs 268 is possible, while rotational movement therebetween is prevented. Each of the knuckle-like stabilizer projections 258 includes, in communication with the shaft aperture 272, a pair of diametrically opposed slots 274 which are of a size so as to receive the projecting lugs 268 in a manner so as to prevent pivotal movement of the associated tail stabilizer 48. The lugs 268 are urged into locking engagement within the slots 274 by means of a biasing compression coil spring 276 engaged about the shaft 260 and bearing, through a washer 278 against the rear body projection 262, and against the rear lug 268, through a washer 280. The retraction of the lugs 268 from the slots 274 is achieved through an elongated control cable 282 fixed to the rear end of the slidable rod 266 and guided over suitable pulleys 284. Once the lugs 268 have been withdrawn from the slots 274, movement of the stabilizer 48, either upward or downward, is possible. This movement is achieved through elongated cables 286 fixed within peripheral grooves 288 in the projections 258, with the cables being suitably wound on a centrally located winding drum 290 mounted on a driven shaft and selectively lockable in any of a plurality of rotational positions through a spring biased pawl 292 releasably engaged with a cogwheel 294. In this manner, upon a release of the lugs 268 and the pawl 292, the stabilizers 48 can be adjusted either upwardly against the rudder 296, or downwardly as illustrated in FIGURE 2, and locked in either position, or an intermediate position, by the pawl 292 engaged with the cogwheel 294. Once the tail stabilizers 48 have been removed away from the horizonal position, the tension in the control cable 282 is released, whereby, through the spring 276, upon movement of the stabilizers 48 back to the horizontal position, the lugs 268 will be automatically engaged within the slots 274.

After the wings 42 have been vertically positioned, the jets 46 themselves are adjusted from their horizontal position through the mechanism detailed in FIGURES 25–29. This mechanism includes an inner plate 296 having a concave inner face 298 conforming to the jet engine 46, this inner plate 296 being rigidly affixed to the engine 46. The outer face of the inner plate member 296 includes concentric outwardly projecting arcuate ribs 300 which in turn form arcuate depressions or grooves 302. Each of the ribs 300 include peripherally spaced notches 304 along the outer edge thereof. A tubular shaft 306 is fixed concentrically to the inner plate 296 and projects laterally therefrom for rotational reception through a tubular bearing 308 in the outer plate 310, this outer plate being, in effect, an integral extension of the adjoining engine support arm 110. The inner face of the outer plate 310 is also provided with a plurality of concentric arcuate ribs 312 and grooves 314 which are nestable with the ribs 300 and grooves 302 of the outer face of the inner plate 296 whereby a rotation of the inner plate 296, and jet engine 46 fixed thereto, relative to the outer plate 310 and mounting arm 110 is possible. With reference to FIGURE 27, it will be noted that the inner face of the outer plate 310 is also provided with a plurality of radially extending grooves 316 which are selectively alignable with the notches 304 in the plate 296. Each of the grooves 316 includes, adjacent the inner end thereof, an elongated slot 318 extending completely through the outer plate 310.

Slidably received within the radial grooves 316 and controlled by control rods 320 projecting laterally through the slots 318 are a plurality of lock plates 322 having a pair of projecting locking lugs 324 thereon. When it is desired to rotate the inner plate 296 and engine 46 freely relative to the outer plate 310, the locking members or plates 322 are moved radially outward so as to orientate the locking lugs 324 in alignment with the raised ribs 312 of the outer plate 310, these lugs 324 being of a length equal to or slightly less than the width of the ribs 312. However, when the inner and outer plates 296 and 310 are to be locked relative to each other, the locking plates 322 are moved radially inward so as to position the locking lugs 324, while still partially aligned with the ribs 312, within the notches 304, thereby preventing rotational movement of the plates.

Simultaneous movement of all of the locking plates 322 is effected through a control disk 326 positioned against the outer face of the outer plate 310 and rotatably mounted on the shaft 306. The control disk or wheel 326 includes a plurality of circumferentially spaced arcuate slots 328 therethrough. These slots 328 curving gradually outward so as to position one end of each slot 328 inwardly relative to the other end thereof. The control rods 320 integral with the locking plates 322 are received within the slots 328 in a manner whereby a rotation of the disk 326 in one direction will cause a simultaneous sliding movement of all of the plates 322 radially inward within their grooves 316, and a movement of the disk 326 in the opposite direction will cause a radial outward movement of the locking plates 322 in the grooves 316, for locking and unlocking the inner and outer plates 296 and 310 relative to each other. The control disk 326 includes a fixed abutment or lug 330, projecting radially from the periphery thereof. This abutment 330 with reference to FIGURE 25, is rotationally aligned with a fixed abutment 332 on the outer face of the outer plate 310, and an expanded compression coil spring 334 is engaged therebetween in a manner so as to bias the control plate or disk 326 in a direction contemplated to move each locking plate 322 radially inward into its locking position. In order to move the locking lugs 324 radially outward into an unlocked position, a control cable 336 is fixed to the disk abutment 330 and threaded through the spring 334 and plate abutment 332 whereby a pull on the control cable 336 will effect a rotation of the disk 326 on the shaft 306, and consequently a radially outward movement of the locking lugs 324 out of engagement with the notches 304, thereby allowing for a rotation of the inner plate and the engine 46.

The actual rotation of the plate 296 and the engine 46 is achieved through a spur gear 338 fixed to the projecting end of the shaft 306, this spur gear 338 also locking the disk 326 on the shaft. An elongated worm gear 340 is engaged with the spur gear 338 and controlled through a control cable 342 engaged over a pulley 344 fixed to the shaft 346 of the worm gear 340. Thus, it will be appreciated that the rotational adjustment of the engine 46 is achieved by first disengaging the locking lugs 324 through a pull on the control cable 336, and subsequently effecting the rotation of the engine 46 through the control cable 342. When the desired orientation of the engine 46 is reached, the control cable 336 is released with the spring 334 automatically rotating the control disk 326 and moving the locking plates 332 into locking engagement.

Referring now specifically to FIGURES 30, 31 and 32, attention is directed to the fact that each of the jet engines 46 of the instant invention include both the selectively closable shutter 58, and means for providing a gas barrier, both located at the intake end of the engine 46. These features are particularly useful as a means for excluding, from the engine 46, any dust and/or water which might be splashed up by the thrust of the jet when vertically taking off from soft ground or the water. Under such circumstances, it is contemplated that liquid air be introduced to the engine 46, this in itself being desirable inasmuch as the supply of air generally provided from the gliding movement of the plane during a conventional horizontal take off is not available in the vertical take off contemplated by this invention. This liquid air can be introduced in any conventional manner from any conventional source.

The shutter 58 includes a plurality of overlapping arcuate flat thin blades 348, each pivotally mounted, inward of the rear end thereof, to a rigid radially inwardly extending projection 350, this point of pivotal engagement being indicated by reference numeral 352. A first flexible cable 354 is fixed to each blade 348 forward of the pivot point 352, and a second soft flexible cable 356 is fixed to each shutter blade 348 rearward of the pivot point 352. Both of these cables 354 and 356 extend through apertures in the engine housing, and have the outer ends thereof fixedly locked to a ring 358 slidable about the exterior of the engine housing within guide rings or loops 360. As will be appreciated from FIGURES 31 and 32, the pair of cables 354 and 356, which are incidentally of course associated with each of the blades 348, are of a length whereby rotation of the control ring 358 in one direction will effect an opening pivotal movement of the shutter blades 348, while a rotational movement of the control ring 358 in the opposite direction will effect a pivotal movement of the shutter blades 348 in the opposite direction to a closed position.

The blades 348 are normally maintained in their open position through the biasing force of a compression coil spring 362 which is engaged between a fixed abutment 364 on the ring 358, and a second abutment 366 fixed to the motor housing. In order to effect the closing of the shutter 58, an elongated control cable 368 is provided, this control cable being fixed to an arcuate guide rod 370 which is in turn slidably received through a mounting lug 372, the fixed abutment 366, and the coil spring 362, and is secured, at the end thereof, to the ring abutment 364 whereby a pull on the control cable 368 will effect a movement of the ring 358 so as to produce a closing of the shutter 58. Upon release of the control cable 368, it will be appreciated that the spring 362 will effect an automatic opening of the shutter 58 through an outward pivoting of the shutter blades 348.

The fluid barrier or gas tent also used to close off the intake end of each engine 46 is provided through a circular hollow conduit 374 located forward of the shutter 58 and including a plurality of holes 376 extending through the inner wall thereof and directed radially inward toward the center of the engine 46, this conduit 374 being communicated, through pipe 378, with a source of pressurized air or gas, generally the engine 46 itself, whereby the expelling of the gas through the holes 376 will form the fluid barrier just forward of the shutter 58, thereby providing additional protection against the entry of dust or water into the engine 46.

In operating the airplane 40, prior to takeoff, the sliding lock bolts 128, and pawls 70 and 84 are released, and the wings 42 subsequently moved to their vertical position through the control cable 76, the tips of the wings 42, in the vertical position, automatically locking together by engagement of the arrow-headed projection 88 within the jaws 90. At the same time, the pawl 292 and locking lugs 268 are released, and the tail stabilizers 48 gathered or moved downwardly through the control cables 286. Next, the control disk 326 is rotated so as to disengage the locking lugs 324 so as to allow a rotation of the jet engine 46, each engine being adjusted in the same manner, to its upright or vertical position through the control cable 342, worm gear 340 and spur gear 338. A rotation of the control disk in the opposite direction upon achieving the vertical position of the jet engine is effected so as to lock the engine in this vertical position.

In the event the plane 40 is taking off from soft ground or water, the shutters 58 are closed, a gas barrier is formed through the conduit 374 forward of each shutter, and liquid air is fed to the engines until a predetermined height is achieved, after which the shutters are opened and the gas barrier shut off. This phase of the take off closely resembles a pigeon gathering his wings closely to his body and leaping into the air.

Once the plane 40 is airborne, the engines 46 are released and slowly returned to their original horizontal position whereby the movement of the plane 40 gradually changes from a vertical to a horizontal direction. As the engines 46 are being moved back to the horizontal position, the jaws 90, at the wind tips, are opened, and the pawls 84 and 292 released so as to allow a gradual return of both the wings 42 and the tail stabilizers 48 to their original horizontal positions. It is contemplated that the air flow between the wings 42 will facilitate this return of the wings to the horizontal position. This phase of the take off corresponds to the bird spreading its wings and commencing forward flight.

In descending, the wings 42 and the tail stabilizers 48 are both rotated upwardly into diverging relation with each other, and the engines 46 shut off so as to allow the plane 40 to glide while the engines are rotated approximately 135 degrees. At this point, the engines 46 are activated so as to provide a braking thrust which tends to halt the glide of the plane 40. At this time, the engines are vertically orientated and operated so as to support the plane 40 for a gradual descent to the ground, the wings 42 and tail stabilizers 48 being gathered upwardly so as to project substantially vertically.

If the plane 40 is to land on soft ground, the landing palms 50 and 52 are extended with the wheels retracted. If the ground is hard, the wheels are extended. After landing, the distance between the belly of the plane 40 and the ground can be varied, so as to lower the plane for allowing a disembarking of the passengers, through a spreading of the legs of the landing palms 50 and 52.

In the event the plane 40 is to land on water, the landing palms remain retracted, and the frog sacks are inflated and expanded outwardly, and the plane 40 brought down gradually as described supra. Incidentally, when taking off from water, the air from the frog sacks may be expelled through suitable apertures in the bottom of the fuselage so as to help reduce the surface tension as the plane 40 rises.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, engine means, means mounting said engine means on each support frame for movement between a substantially horizontal position and a substantially vertical position and means for releasably locking said wings to said frames when said wings are in their generally horizontal position.

2. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, jet engine means, means mounting said jet engine means on each support frame for movement between a substantially horizontal position and a substantially vertical position, said wings and said jet engine means being independently movable, recesses within the lower surface of each wing, the support frames being receivable within the wing recesses when said wings are in their generally horizontal position, and means for releasably locking said wings to said frames.

3. The structure of claim 2 including means for selectively fixing said wings in a plurality of adjusted positions, and means for selectively fixing said jet engine means in a plurality of adjusted positions.

4. The structure of claim 3 wherein said aircraft includes a pair of tail stabilizers projecting laterally from opposite sides of the body rearward of said wings, and means mounting said stabilizers on said body for movement between a generally horizontal position and a generally vertical position.

5. The structure of claim 4 including means for selectively fixing said stabilizers in a plurality of adjusted positions.

6. The structure of claim 5 including means for automatically interlocking the remote ends of said wings when said wings are in their generally vertical position.

7. The structure of claim 6 including landing gear means for accommodating various landing surface conditions, said landing gear means including a pair of expansible float means, said aircraft body including an elongated recess along each side thereof, each recess receiving one of said float means, and a closure means for each recess, each closure means closing the corresponding recess upon a deflation of the float means and forming a generally smooth continuation of the body surface.

8. The structure of claim 7 wherein said landing gear means further includes a plurality of enlarged generally horizontally orientated landing pads, means adjustably mounting said pads on said aircraft body for effecting a vertical adjustment of the horizontally orientated pads relative to said body, said last mentioned means being capable of fixing said pads in a plurality of vertically adjusted positions, each of said pads having a recess in the lower surface thereof, a plurality of wheels, and means adjustably mounting one of said wheels on each pad for movement between a first position wherein the wheel is completely received within the recess and a second position wherein the wheel is extended into a ground engaging position below the pad.

9. The structure of claim 8 wherein said jet engine means includes selectively operable shutter means adjacent the intake end thereof, and means for establishing a fluid barrier axially spaced from the shutter means on the intake side thereof.

10. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, jet engine means, means mounting said jet engine means on each support frame for movement between a substantially horizontal position and a substantially vertical position, and means for automatically interlocking the remote ends of said wings when said wings are in their generally vertical position.

11. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, jet engine means, means mounting said jet engine means on each support frame for movement between a substantially horizontal position and a substantially vertical position, and landing gear means for accommodating various landing surface conditions, said landing gear means including a pair of expansible float means, said aircraft body including an elongated recess along each side thereof, each recess receiving one of said float means, and a closure means for each recess, each closure means closing the corresponding recess upon a deflation of the float means and forming a generally smooth continuation of the body surface, said landing gear means further including a plurality of enlarged generally horizontally orientated landing pads, means adjustably mounting said pads on said aircraft body for effecting a vertical adjustment of the horizontally orientated pads relative to said body, said last mentioned means being capable of fixing said pads in a plurality of vertically adjusted positions, each of said pads having a recess in the lower surface thereof, a plurality of wheels, and means adjustably mounting one of said wheels on each pad for movement between a first position wherein the wheel is completely received within the recess and a second position wherein the wheel is extended into a ground engaging position below the pad.

12. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, jet engine means, and means mounting said jet engine means on each support frame for movement between a substantially horizontal position and a substantially vertical position, said jet engine means including selectively operable shutter means adjacent the intake end thereof, and means for establishing a fluid barrier axially spaced from the shutter means on the intake side thereof.

13. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, engine means, means mounting said engine means on each support frame for movement between a substantially horizontal position and a substantially vertical position, and landing gear means, said landing gear means including a plurality of enlarged generally horizontally orientated landing pads, means adjustably mounting said pads on said aircraft body for effecting a vertical adjustment of the horizontally orientated pads relative to said body, said last mentioned means being capable of fixing said pads in a plurality of vertically adjusted positions, each of said pads having a recess in the lower surface thereof, a plurality of wheels, and means adjustably mounting one of said wheels on each pad for movement between a first position wherein the wheel is completely received within the recess and a second position wherein the wheel is extended into a ground engaging position below the pad.

14. An aircraft capable of both vertical and horizontal flight, comprising an elongated body, a laterally extending wing projecting from each side of said body, means mounting the wings on said body for movement between a generally horizontal position and a generally vertical position, engine means, means mounting said engine means on said body for movement between a substantially horizontal position and a substantially vertical position, and landing gear means including a plurality of enlarged generally horizontally orientated landing pads, means adjustably mounting said pads on said aircraft body for effecting a vertical adjustment of the horizontally orientated pads relative to said body, said last mentioned means being capable of fixing said pads in a plurality of vertically adjusted positions, each of said pads having a recess in the lower surface thereof, a plurality of wheels, and means adjustably mounting one of said wheels on each pad for movement between a first position wherein the wheel is completely received within the recess and a second position wherein the wheel is extended into a ground engaging position below the pad.

15. An aircraft capable of both vertical and horizontal flight, comprising an elongated body, a laterally extending wing projecting from each side of said body, means mounting the wings on said body for movement between a generally horizontal position and a generally vertical position, a support frame fixed to each side of said body and projecting laterally therefrom beneath and independent of the corresponding wing, jet engine means, means mounting said jet engine means on each support frame for movement between a substantially horizontal position and a substantially vertical position, and means for selectively establishing a fluid barrier on the intake end of the jet engine means.

16. The structure of claim 1 wherein said means for movably mounting said engine means includes, in each instance, a first plate rigidly fixed to the engine means, a second plate rigidly fixed to the support frame, said first plate and engine means being rotatably engaged with the second plate through mating arcuate ribs and grooves, said first plate having radially orientated notches in its ribs, said second plate having radial slots therein selectively alignable with the notches, sliding lock plate means in said radial slots, means for simultaneously moving said lock plate means radially in said radial slots into and out of engagement with said notches, said lock plate means, when engaged in said notches, fixing said plates to each other against rotational movement relative to each other, said lock plate means, when out of engagement with the notches, allowing rotational movement of the first plate relative to the second plate, and means for effecting a rotation of the first plate and engine means.

References Cited in the file of this patent

UNITED STATES PATENTS

| | | |
|---|---|---|
| 1,703,621 | Haworth | Feb. 26, 1929 |
| 1,710,670 | Bonney | Apr. 23, 1929 |
| 1,736,226 | Spencer | Nov. 19, 1929 |
| 1,781,182 | Leopold | Nov. 11, 1930 |
| 2,290,850 | Umschweif | July 21, 1942 |
| 2,363,129 | Heitmann | Nov. 21, 1944 |
| 2,814,454 | Atkins | Nov. 26, 1957 |
| 2,926,869 | Sullivan | Mar. 1, 1960 |
| 2,930,551 | Haberkorn | Mar. 29, 1960 |
| 2,988,301 | Fletcher | June 13, 1961 |
| 3,004,737 | Boyle et al. | Oct. 17, 1961 |
| 3,070,327 | Dornier et al. | Dec. 25, 1962 |

FOREIGN PATENTS

| | | |
|---|---|---|
| 1,104,478 | France | June 15, 1955 |